Aug. 1, 1967  A. FREEMAN  3,333,672
CONVEYOR SYSTEMS
Filed Jan. 21, 1966  3 Sheets-Sheet 3

United States Patent Office 3,333,672
Patented Aug. 1, 1967

3,333,672
CONVEYOR SYSTEMS
Alfred Freeman, The Haven, Orlingbury Road, Isham, near Kettering, Northamptonshire, England
Filed Jan. 21, 1966, Ser. No. 522,106
8 Claims. (Cl. 198—1)

This invention relates to conveyor systems of the kind which includes a travelling driving means and a plurality of work or goods carriers which can be individually coupled up to the driving means for transport along the system, or can be uncoupled therefrom so as to come to rest, as and when required.

It is an object of this invention to provide an improved system of this kind in which the component parts are of simple and robust construction and reliable in operation.

Another object is a system in which the despatch of work or goods can be bought automatically by the simple action of loading a carrier.

This, of course, is of considerable advantage in terms of time saving on the part of personnel using the system.

Figure 1:
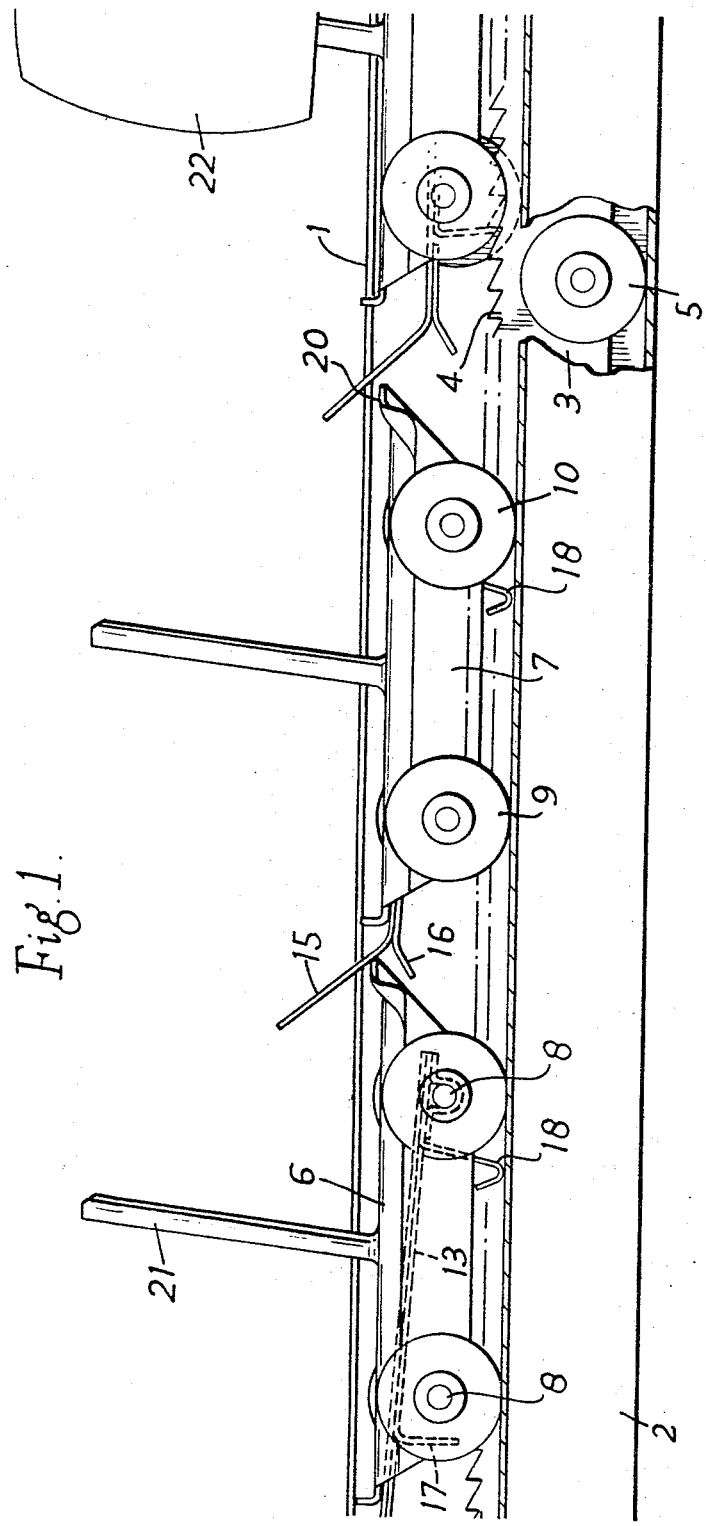
Figure 2:
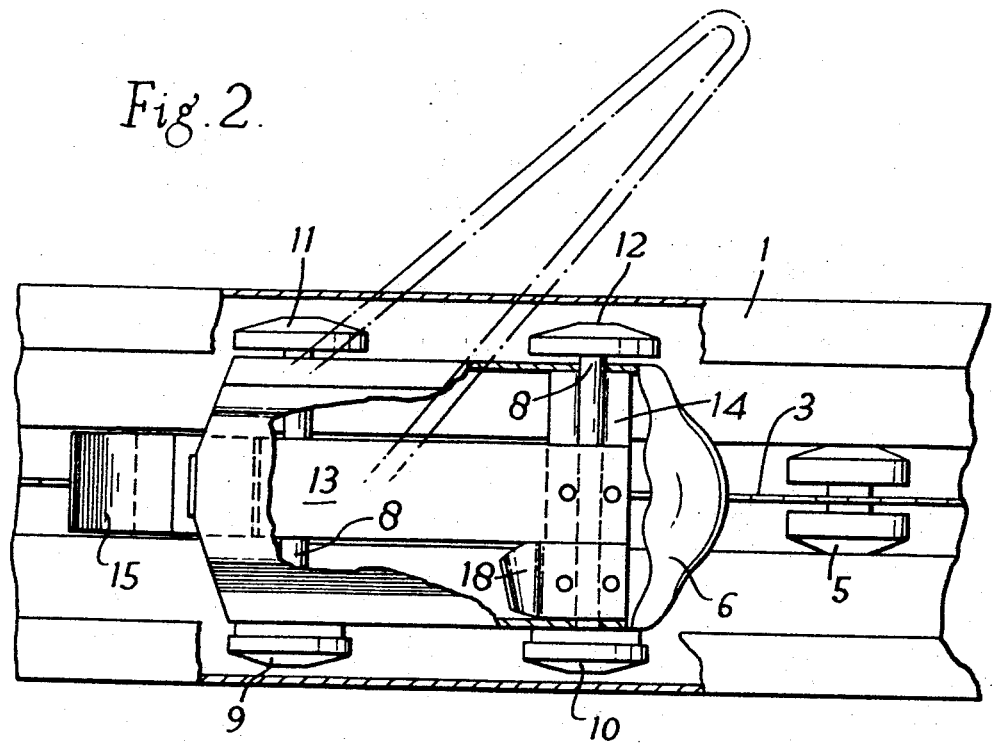
Figure 3:
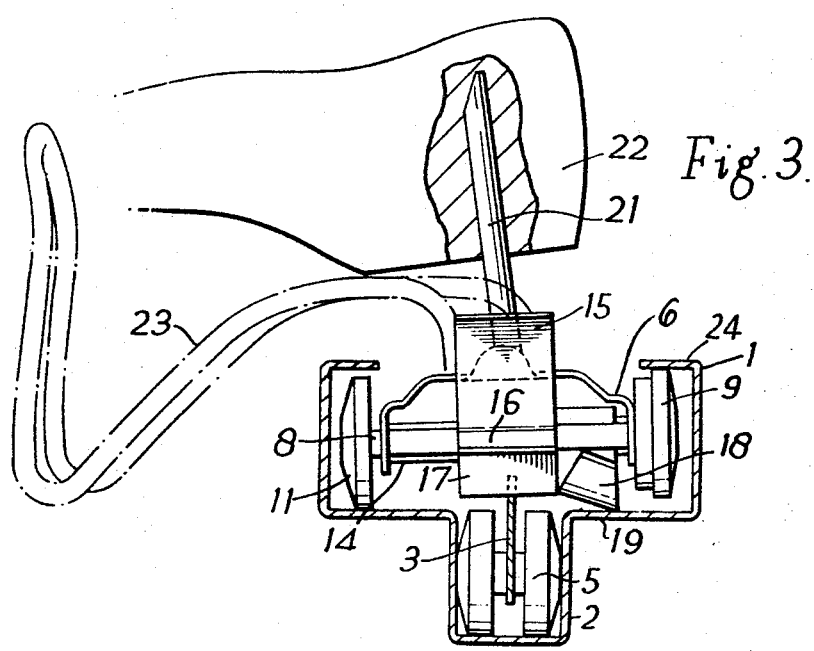
Figure 4:
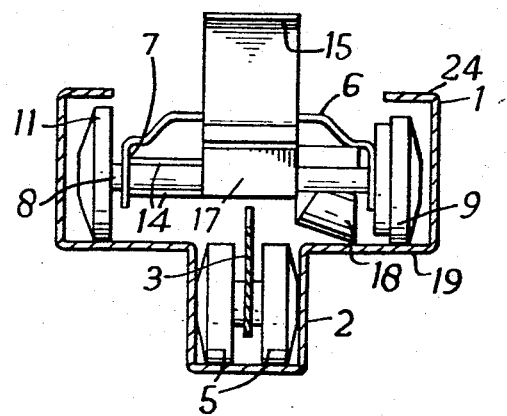

Further objects and advantages of the invention will hereinafter become apparent, particularly in relation to a specific example shown in the accompanying drawings, in which:

FIGURE 1 is a sectional elevation of part of a conveyor system, used in a boot and shoe factory, incorporating carriers fulfilling the requirements of the invention, FIGURE 2 is a plan view of one of these carriers, shown passing along the system, with parts cut away and in section, FIGURE 3 is a front elevation of the carrier shown in its normally-loaded condition, and FIGURE 4 is a similar illustration but showing the carrier unloaded.

The representative example chosen for illustration refers to an arrangement wherein the carriers are used for the transportation of lasts, or partially-finished shoes, from one point to another in a boot and shoe factory. The system used is, in the case illustrated, assumed to run horizontally through the workroom and comprises an open-topped channel 1 in which the trolleys run and having depending sub-channel 2 serving as a guide for the driving means of the system. This driving means consists of an endless strip 3 of flexible steel which is toothed at 4, at its upper side and is provided at intervals along its length with nylon guide wheels 5 which run in the sub-channel 2. In this situation, the teeth project up into the main channel 1 midway across the width of the latter. The chain is driven continuously or intermittently in one direction around the circuit by any suitable driving means, for example by an electric motor (not shown).

Each carrier has a body 6 of robust sheet metal which is pressed to provide it with downturned sides 7 which support the axles 8 of pairs of front and rear wheels, the wheels of each pair being of contrasting form. Hence the front and rear wheels 9 and 10 at the near side of the carrier are of significant weight (e.g. reinforced metal), whilst the offside front and rear wheels, viz. 11 and 12 respectively are of lighter construction, being for example of nylon.

Each carrier is furnished with a catch device which is constituted by a strip 13, running longitudinally and centrally of the carrier and attached to a pair of cooperating plates 14 which are shaped to define a sleeve bearing engaged round the rear axle 8 of the carrier. The strip 13, which in practice is of double thickness as shown in the drawings, thus extends for substantially the full length of the carrier beneath the upper shell of the body 6 to emerge from the leading end of the carrier. Here it is provided with an upturned extension piece 15 and a downturned feather 16 for purposes which will be referred to later. In addition it is provided a small distance inwards of the leading end of the carrier body with a downturned piece 17 forming the catch proper, i.e. the element which engages with the teeth 4 of the driving strip to provide a drive coupling which will propel the carrier along the conveyor system.

It will also be observed that the catch device is furnished, at the near side, with a contact piece 18 consisting of a further length of metal which is bent substantially into J-form in cross-section and is arranged with the bend of the J inclined to the horizontal. This contact piece 18 is welded to the strip 13 at a position shortly in front of the laminated plates 14 so as to depend from the latter, and thereby to pivot with the catch strip 13 relatively to the rear axle 8 of the carrier. As will be seen from FIGURES 3 and 4, the contact piece 18 is arranged so that it will at all times contact with the upper face 19 of the inner side shoulder of the channelling of the system.

The carrier body 6 is formed at its rear end with an upturned lip 20 and carries at its upper side an upstanding jack pin 21 which is slightly inclined to the vertical in a direction towards the loading side of the carrier, i.e. to the side opposite to catch piece 18. This jack pin is of a standard type used for mounting of a last in conventional fashion, as indicated at 22 in FIGURE 3.

The arrangement is such that, with no last or load on the jack pin 21, the carrier will be in normal status with its axles horizontal, i.e. in the condition illustrated in FIGURE 4 of the drawings. It will there be seen that the effect of the contact piece 18 is to pivot the catch strip 13 relatively to the rear wheel axle 8 and to lift the catch 17 away from the contact with the driving teeth 4. In other words, the carrier will remain stationary in the system (failing other fortuities) with the driving strip 3 moving idly past it. When, however, a last is mounted on the jack pin 21, the immediate effect of the off-center loading is to cause the carrier to fulcrum as a whole about the offside wheels 11 and 12, thereby lifting the side wheels 9 and 10 off the trackway surface 19. The contact piece 18 will, however, remain in contact under its own weight with surface 19 and as a result the catch strip 13 will be tipped downwards relatively to body 6 and catch 17 will drop into the path of the driving teeth 4. As a consequence, the carrier will now be propelled along by these teeth, being supported by the wheels 11 and the contact piece 18. Any tendency to excessive tilting would be restrained by engagement of wheels 9 and 10 with the inturned lip 24 of the trackway 1. Indeed, in some circumstances the wheels 9 and 10 could run on this lip during conveyance of heavy loads.

In this way an operator can simply despatch the work to its destination by loading it with a last, and the unloader at the destination will stop the carrier again simply by lifting off the last, in which event the original conditions will be reestablished and the carrier arrested. It may, in practice, be convenient to arrange for arrest in this way without the need for human intervention. For example a ramp or similar abutment could be provided above, say, the inner side wheels of the carrier, at the intended stopping place, to cause the carrier to tip back into horizontal status even when carrying a load.

Reference has been made above to the loading and unloading of carriers with lasts 22. It will be appreciated, however, that the carrier can be equipped for other transporting duties, for example for conveying shoe uppers not mounted on lasts. For this purpose, for example, the carrier could be equipped with a loading hook 23 extending to the offside of the carrier and providing for a similar offset loading to the arrangement previously described. Indeed a carrier could be equipped with both of these forms of mounting means or, indeed, any other forms of holder which may be appropriate to the particular type of work to be dealt with in the establishment concerned, the only criterion being that the work or goods shall apply a unilateral loading to the carrier.

The provision of the lip 20, the extension piece 15 and the feather 16 of the catch device are to cater for the likelihood that carriers might congregate together, or one at least might approach a preceding carrier, and tend to cause an inconvenient shifting of a stationary carrier or carriers. The elements in question, in fact, represent safety devices to combat this and it will be seen that, in the event that a carrier runs up against a preceding and stationary carrier, the effect of the rear lip 20 of the latter will be to slide down the extension piece 15 of the former and so lift the strip 13 of the latter and its catch 17 out of engagement with the driving strip 3, thereby to bring the oncoming carrier to a standstill. The feather 16 ensures positive engagement.

It may, of course, happen that more than two carriers may arrive at the unloading station and queue up there awaiting their turn for unloading. According to a further feature of the invention provision is made for advancing these carriers when the leading carrier (which in its unloaded condition has held them all up) is loaded and automatically despatched again whilst the operator simultaneously extracts the goods or work from the next succeeding carrier. This can be accomplished in various ways, for example by the provision of a board or the like at the unloading station to tilt the carrier at this station, so coupling it up to the driving means and allowing to be inched forward to the adjacent loading station, even though it is empty.

In a similar manner, provision may also be made for holding the carrier against tilting even when loaded, for example where it is required to rest the carrier without detaching the load. To this end, example a fillet may be provided on the upper guide rail at the relevant site to prevent the wheels lifting at the contact piece side.

It will be understood that carriers and other parts of the system according to the present invention can take various forms and be fitted in various ways to fulfill the requirements stated above, depending on the general layout and route of the system, the method of transport required, the types of load involved, and so on. Thus, for example, the carriers could run along a horizontal trackway with linear driving means disposed alongside the trackway or above it, the work- or goods-supporting means could be arranged above, below, or laterally of the carriers, and so on. All these and other variants can be catered for by appropriate and simple application of the features of the invention enunciated above.

I claim:

1. A conveyor system comprising a vehicle trackway, a guideway disposed beneath said trackway, a driving strip having notches at one edge and arranged in said guideway with its notched edge projecting into the confines of said trackway, and a plurality of carriers displaceable along said trackway, each of said carriers comprising a body portion, a catch device pivotally associated with said body portion, and having a catch piece for releasable engagement with the notches on said driving strip, a load-supporting means connected to said body portion and disposed to apply a lateral tilting action to said body portion in response to loading thereof, and a biasing means connected to said catch piece for biasing said catch piece into engagement with a notch on said driving strip in response to the aforesaid lateral tilting action.

2. A conveyor system according to claim 1 in which said biasing means is a contact piece connected to said catch device for pivotal movement therewith, said contact piece being weight-biased into contact at all times with said trackway and being disposed at the opposite side of the driving strip to the vertical through the centre of gravity of a load disposed on said load-supporting means.

3. A conveyor system according to claim 1, in which the carrier body has wheels to run along said trackway, and the catch device comprises a strip pivoted to said body at the rear part of the latter and extending forwards beneath this body, said strip being provided at its forward end part with a downturned catch piece.

4. A conveyor system according to claim 3, in which said catch device strip is connected at its rear end part to a sleeve which is pivotally mounted on the axle of a rear pair of wheels of the carrier, said sleeve further having a contact piece projecting forwardly therefrom at one side of said catch device strip.

5. A conveyor system according to claim 4, in which the contact piece has a contact portion of curved cross-section for engagement with said trackway.

6. A conveyor system according to claim 5, in which the catch device strip is furnished with an upturned extension piece at its leading end, and the body portion of the carrier has, at its rear end, a raised lip positioned to engage, and raise, the extension piece and catch device strip of a carrier butted against it from the rear.

7. A conveyor system according to claim 1, in which the notches of said driving strip are of saw-tooth form.

8. A conveyor system according to claim 1, in which the said trackway is of channel form and the guideway is also of channel form but of smaller width and constitutes a downward projection from said trackway.

References Cited

UNITED STATES PATENTS 3,208,401  9/1965  Freeman _____ 104—178

EVON C. BLUNK, *Primary Examiner.*

RICHARD E. AEGERTER, *Examiner.*